US011880790B2

(12) United States Patent
Candas et al.

(10) Patent No.: US 11,880,790 B2
(45) Date of Patent: Jan. 23, 2024

(54) SPATIO-TEMPORAL APPROACH TO SCHEDULING FIELD OPERATIONS

(71) Applicant: Utopus Insights, Inc., Valhalla, NY (US)

(72) Inventors: Mehmet F. Candas, Croton On Hudson, NY (US); Arun Hampapur, Norwalk, CT (US); Tarun Kumar, Mohegan Lake, NY (US); Shilpa N. Mahatma, Mohegan Lake, NY (US)

(73) Assignee: Utopus Insights, Inc., Valhalla, NY (US)

( * ) Notice: Subject to any disclaimer, the term of this patent is extended or adjusted under 35 U.S.C. 154(b) by 0 days.

(21) Appl. No.: 13/836,785

(22) Filed: Mar. 15, 2013

(65) Prior Publication Data
US 2014/0278654 A1 Sep. 18, 2014

(51) Int. Cl.
*G06Q 10/0631* (2023.01)
*G06Q 10/047* (2023.01)

(52) U.S. Cl.
CPC ..... *G06Q 10/06313* (2013.01); *G06Q 10/047* (2013.01)

(58) Field of Classification Search
CPC ................................. G06Q 10/06313
See application file for complete search history.

(56) References Cited

U.S. PATENT DOCUMENTS

| 6,339,745 | B1* | 1/2002 | Novik | G07C 5/008 342/357.31 |
| 6,779,060 | B1* | 8/2004 | Azvine | G06F 3/038 710/65 |
| 7,627,666 | B1 | 12/2009 | DeGiullo et al. | |
| 7,788,121 | B1* | 8/2010 | Smith et al. | 705/7.26 |
| 7,996,352 | B2 | 8/2011 | Jung et al. | |
| 8,214,243 | B2* | 7/2012 | Graham et al. | 705/7.22 |
| 2002/0065700 | A1* | 5/2002 | Powell et al. | 705/9 |
| 2005/0091096 | A1* | 4/2005 | Coates | G06Q 10/047 705/7.26 |

(Continued)

FOREIGN PATENT DOCUMENTS

WO    WO-9935585 A1 *  7/1999  ........... G01S 5/0027

OTHER PUBLICATIONS

Hendrickson, Chris; "Project Management for Construction: Fundamental Concepts for Owners, Engineers, Architects and Builders"; Published 2008; Department of Civil and Environmental Engineering, Carnegie Mellon University; Version 2.2; ch. 10.*

(Continued)

*Primary Examiner* — Romain Jeanty
(74) *Attorney, Agent, or Firm* — Ahmann Kloke LLP

(57) ABSTRACT

A method for creating a spatio-temporal schedule includes receiving a set of available work crews and a set of workorders to be scheduled, sequencing the set of workorders, wherein each workorder of the set of workorders is associated with a geographic location, a start time and an end time, and iterating through the set of available work crews, assigning a plurality of workorders of the set of workorders fully allocating a current crew before selecting a next crew, until all work crews are fully allocated and/or all workorders are assigned, wherein the assignment of workorders for a given work crew generates a route comprising the plurality of workorders.

8 Claims, 8 Drawing Sheets

(56) References Cited

U.S. PATENT DOCUMENTS

| | | | | |
|---|---|---|---|---|
| 2007/0173993 | A1* | 7/2007 | Nielsen | G06Q 10/06 |
| | | | | 701/33.4 |
| 2008/0040190 | A1* | 2/2008 | Khosla et al. | 705/9 |
| 2008/0046298 | A1* | 2/2008 | Ben-Yehuda | G06Q 10/025 |
| | | | | 705/6 |
| 2009/0240554 | A1* | 9/2009 | Oswald | G06Q 50/26 |
| | | | | 348/207.1 |
| 2009/0254407 | A1 | 10/2009 | Fagan et al. | |
| 2009/0299939 | A1 | 12/2009 | Jung et al. | |
| 2010/0198652 | A1* | 8/2010 | Spanton, Jr. | G06Q 10/067 |
| | | | | 705/7.17 |
| 2010/0205022 | A1* | 8/2010 | Brown | G06Q 10/047 |
| | | | | 705/7.11 |
| 2010/0312605 | A1* | 12/2010 | Mitchell et al. | 705/9 |
| 2011/0015963 | A1* | 1/2011 | Chafle | G06Q 10/06 |
| | | | | 705/7.16 |
| 2012/0022707 | A1* | 1/2012 | Budhraja | H02J 3/008 |
| | | | | 700/292 |
| 2012/0173296 | A1* | 7/2012 | McMullin | G06Q 10/063112 |
| | | | | 705/7.14 |
| 2012/0253862 | A1* | 10/2012 | Davidson | G06Q 10/08 |
| | | | | 705/7.11 |
| 2012/0259540 | A1* | 10/2012 | Kishore | G06Q 10/06 |
| | | | | 701/410 |
| 2013/0096815 | A1* | 4/2013 | Mason | G01C 21/00 |
| | | | | 701/400 |

OTHER PUBLICATIONS

Hampapur, et al.; "Analytics-Driven Asset Management"; Published Jan. 2011; IBM Journal of Research and Development, vol. 55 Iss. 1.2; p. 13:1-13:19.*

Koes, M., Nourbakhsh, I., Sycara, K. "Heterogeneous Multirobot Coordination with Spatial and Temporal Constraints." AAAI'05 Proceedings of the 20th National Conference on Artificial Intelligence, Jul. 9-13, 2005, Pittsburgh, PA, vol. 3, p. 1292-1297 (Year: 2005).*

Desrosiers, J., Dumas, Y., Solomon, M., Soumis, F. "Time Constrained Routing and Scheduling." Handbooks in Operations Research and Management Science, vol. 8, 1995, p. 35-139. (Year: 1995).*

Lau, H.C., Sim, M., Teo, K.M. "Vehicle Routing Problem with Time Windows and a Limited Number of Vehicles." European Journal of Operational Research, vol. 148, is. 3, Aug. 1, 2003, p. 559-569. (Year: 2003).*

Ernst, AT, Jiang, H, Krishnamoorthy, M, Sier, D. "Staff scheduling and rostering: A review of applications, methods and models." European Journal of Operational Research, vol. 153, is. 1, Feb. 16, 2004, pp. 3-27. (Year: 2004).*

Brusco, MJ, Johns, TR. "An integrated approach to shift-starting time selection and tour-schedule construction." Journal of the Operational Research Society, vol. 62, 2011, pp. 1357-1364. (Year: 2011).*

Higgins, A. "Scheduling of railway track-maintenance activities and crews." Journal of the Operational Research Society, vol. 49, 1998, pp. 1026-1033. (Year: 1998).*

Rossi, F., van Beek, P., Walsh, T. "Introduction." Handbook of Constraint Programming, Elsevier, 2006, pp. 3-10. (Year: 2006).*

WMS "Functions of the Work Management System") Version 1.5, Aug. 19, 2010, pp. 1-45 (Year: 2010).*

Kafura, D.et al.; "Task Scheduling with Critical Section Constraints"; http://www.ip.com/pubview/IPCOM000127992D; Dec. 31, 1976/Sep. 14, 2005.

Kafura, D.-et al.; "Task Scheduling on a Multiprocessor System with Independent Memories"; http://www.ip.com/pubview/IPCOM000127998D; Dec. 31, 1976/Sep. 14, 2005.

* cited by examiner

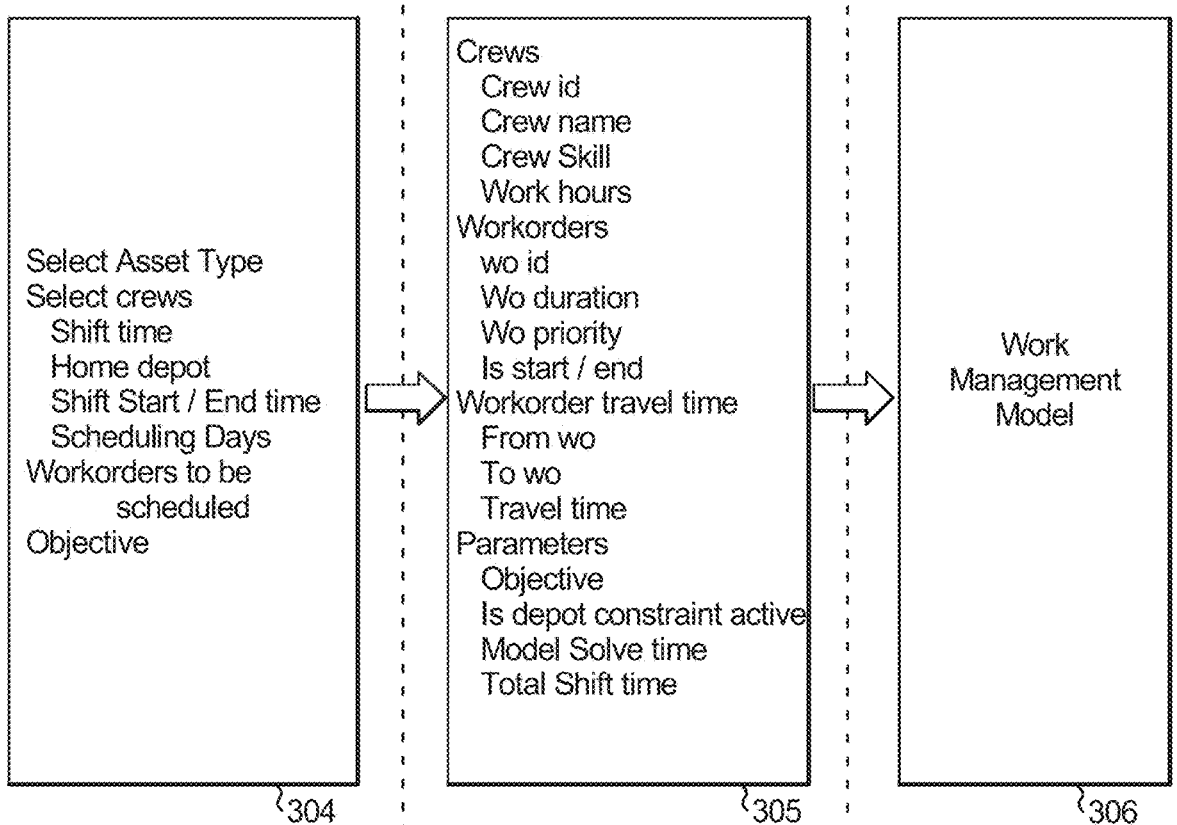
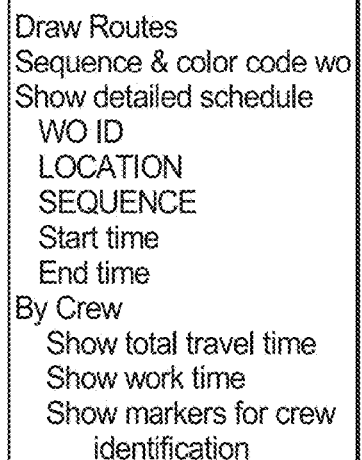
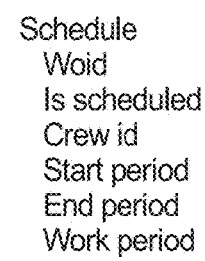
Fig. 3

| RouteId | CrewId | Number of WO's | Total WO's duration | WO priority | Total Time for WO | Total Time for WO | start WO and end WO to depot | Total WO Required | Total WO Optional |
|---|---|---|---|---|---|---|---|---|---|
| 1 | Meter 31 | 33 | 384 | 320 | 8:12 | 8:0 | 0:12 | 33 | 0 |
| 2 | Meter 32 | 32 | 384 | 320 | 8:11 | 7:58 | 0:13 | 32 | 0 |
| 3 | Meter 35 | 33 | 396 | 330 | 8:22 | 8:10 | 0:12 | 33 | 0 |
| 4 | Meter 36 | 33 | 396 | 330 | 8:20 | 8:11 | 0:9 | 33 | 0 |

| CrewId | Color |
|---|---|
| Meter 31 | |
| Meter 32 | |
| Meter 35 | |
| Meter 36 | |

Number of routes: 4
Number of scheduled work orders: 131
Total time (hours:minutes): 32:65
Schedule ID: 2011-48-03-05-48-0014

Model 1 OptSequence: Constraint Programming formulation for workorder sequencing

Input: $S = \{w_1, w_2, ..., w_N\}$      ▷ List of workorders to be sequenced
Output: $\hat{S} = \{\hat{w}_1, \hat{w}_2, ..., \hat{w}_N\}$ $startTime(\hat{w}_n), endTime(\hat{w}_n)$ $n \in 1...N$ ▷ Sequenced workorders 1: using CP;
2: execute {
3:     cp.param.TimeLimit=cp_timelimit;
4: }

5: dvar interval $I_n$ optional in $0...\bar{d}$ size $d_n$   $\forall_n \in 1...N$
6: dvar interval $J_{c^*,n}$ optional in $0...\bar{d}$ size $d_n$   $\forall_n \in 1...N$
7: dvar sequence $S_{c^*}$ in all $(n \in 1...N)$ $J_{c^*,n}$ types $L$ 8: $obj_1 = \Sigma_{n \in N}\, p_n[\textbf{presenceOf}(I_n)]$      ▷Prioritized coverage of workorders
9: $obj_2 = -\max_{n \in N} \textbf{endOf}(J_{c^*,n})$      ▷Completion time of the super crew
10: $obj_3 = \Sigma_{n \in N}\, \textbf{presenceOf}(I_n)$      ▷ Coverage of workorders 11: maximize $o_1(obj_1) + o_2(obj_2) + o_3(obj_3)$;

12: subject to {
13:     alternative $(I_n, J_{c^*,n}) \forall n \in 1...N$ 14:     noOverlap$(S_{c^*,t})$ 15:     if $(isDepot == 1)$ {
16:        presenceOf$(J_{c^*,w0}) == 1$
17:        presenceOf$(I_{w0}) == 1$
18:     }
19: }

*Fig. 5*

Input: $C = \{c_1, c_2, ..., c_M\}$  $S = \{w_1, w_2, ..., w_N\}$
Output: $A_{ml} \, \forall m \in 1...M$ ▷ Assignments for each crew $c_m$

```
1:  Solve OptSequence(S)                              ▷ Returns Ŝ = {ŵ₁, ŵ₂, ..., ŵ_N}

2:  m = 1                                             ▷ Pick first crew, c₁
3:  n = 1                                             ▷ Pick first workorder, w₁
4:  while (C ≠ ∅) AND (Ŝ ≠ ∅) do
5:      startTime(c_m) = startTime(ŵ_n)               ▷ Initialize the start time of c_m
6:      endTime(c_m) = endTime(ŵ_n)                   ▷ Initialize the end time of c_m 7:      while (endTime(c_m) - startTime(c_m)) ≤ availableTime(c_m) do
8:          A_m = A_m ∪ {ŵ_n}                         ▷ Assign workorder ŵ_n to crew c_m
9:          Ŝ = Ŝ \ {ŵ_n}                             ▷ Remove workorder ŵ_n from the sequence Ŝ
10:         n = n + 1                                 ▷ Pick the next workorder in the sequence Ŝ
11:         endTime(c_m) = endTime(ŵ_n)               ▷ Update end time of c_m
12:     end while 13:     if U_m < α Σ_{i∈1...(m-1)} U_i / (m-1) then   ▷ If crew c_m under-perform
14:         A_m = ∅                                   ▷ Remove the assignments from crew c_m
15:         S = Ŝ ∪ A_m                               ▷ Return the assignments back
16:         n = n - |A_m|                             ▷ Reverse the workorder index back
17:         Re-Solve OptSequence(S)                   ▷ Return Ŝ = {ŵ_n, ŵ_{n+1}, ..., ŵ_N}
18:     else
19:         C = C \ {c_m}                             ▷ Remove c_m from available crews C
20:         m = m + 1                                 ▷ Iterate to the next crew
21:     end if
22: end while
```

*Fig. 6*

SPATIO-TEMPORAL APPROACH TO SCHEDULING FIELD OPERATIONS

BACKGROUND

The present disclosure relates generally to field services management, and more particularly, to methods for creating spatio-temporal schedules.

Field services management involves sending out field crews to perform maintenance, repair, delivery, installation and update to customers, equipment or infrastructure. Field services management can be a labor-intensive operation and has applicability across every industry. Managers, foremen and field services management teams may use various processes (manual/semi-automated) to determine the tasks for each period (e.g., day) and assign field crews to these tasks.

BRIEF SUMMARY

According to an embodiment of the present disclosure, a method for creating a spatio-temporal schedule includes receiving a set of available work crews and a set of workorders to be scheduled, sequencing the set of workorders, wherein each workorder of the set of workorders is associated with a geographic location, a start time and an end time, and iterating through the set of available work crews, assigning a plurality of workorders of the set of workorders fully allocating a current crew before selecting a next crew, until all work crews are fully allocated and/or all workorders are assigned, wherein the assignment of workorders for a given work crew generates a route comprising the plurality of workorders.

According to an embodiment of the present disclosure a method for creating a spatio-temporal schedule includes generating a sequence of workorders satisfying an objective, wherein each workorder of the set of workorders is associated with a geographic location, a start time and an end time, and assigning sequential sets of the workorders to respective work crews of a plurality of work crews, wherein an assignment of a sequential set of the workorders to a respective work crew corresponds to a geographic route.

According to an embodiment of the present disclosure, an exemplary method can be performed by a computer program product for creating a spatio-temporal schedule including a computer readable storage medium having computer readable program code embodied therewith.

BRIEF DESCRIPTION OF THE SEVERAL VIEWS OF THE DRAWINGS

Preferred embodiments of the present disclosure will be described below in more detail, with reference to the accompanying drawings:

FIG. 3 is an exemplary work management data flow according to an embodiment of the present disclosure;

FIG. 5 is an exemplary method for workorder sequencing according to an embodiment of the present disclosure;

FIG. 6 is an exemplary method for workorder scheduling according to an embodiment of the present disclosure.

DETAILED DESCRIPTION

Embodiments of the present disclosure relate to efficient field services operations and more particularly to creating a schedule, which simultaneously takes into account multiple constraints and which applies these constraints to create an allocation of tasks to a field services professional or work crew. These constraints can be categorized into spatial constraints and temporal constraints, such that a created schedule is a spatio-temporal schedule. The problem of creating such a schedule can be considered an NP (non-deterministic polynomial-time) hard problem.

According to an exemplary embodiment of the present disclosure, scheduling can be performed in view of spatially distributed assets needing maintenance; temporal maintenance windows and crew availability; crew configuration include skill, equipment and availability; asset work details broken down into tasks; crew-task compatibility; travel constraints; etc.

More particularly, the spatial constraints can address dispersed physical location of the work and take into account the distance between the tasks a field crew or a depot. The spatial constraints can also take into account distances between different locations where tasks are to be performed, distances of the locations where tasks are to be performed to an end location (e.g., a depot location of a work crew), etc. The temporal constraints can address the task dependencies, travel times, shift times, and other time dependent factors.

It should be understood that particular constraints described herein are merely exemplary and that the present disclosure is not limited to these constraints. Indeed, these and other constraints are understood to be contemplated by the present disclosure.

Figure 1:
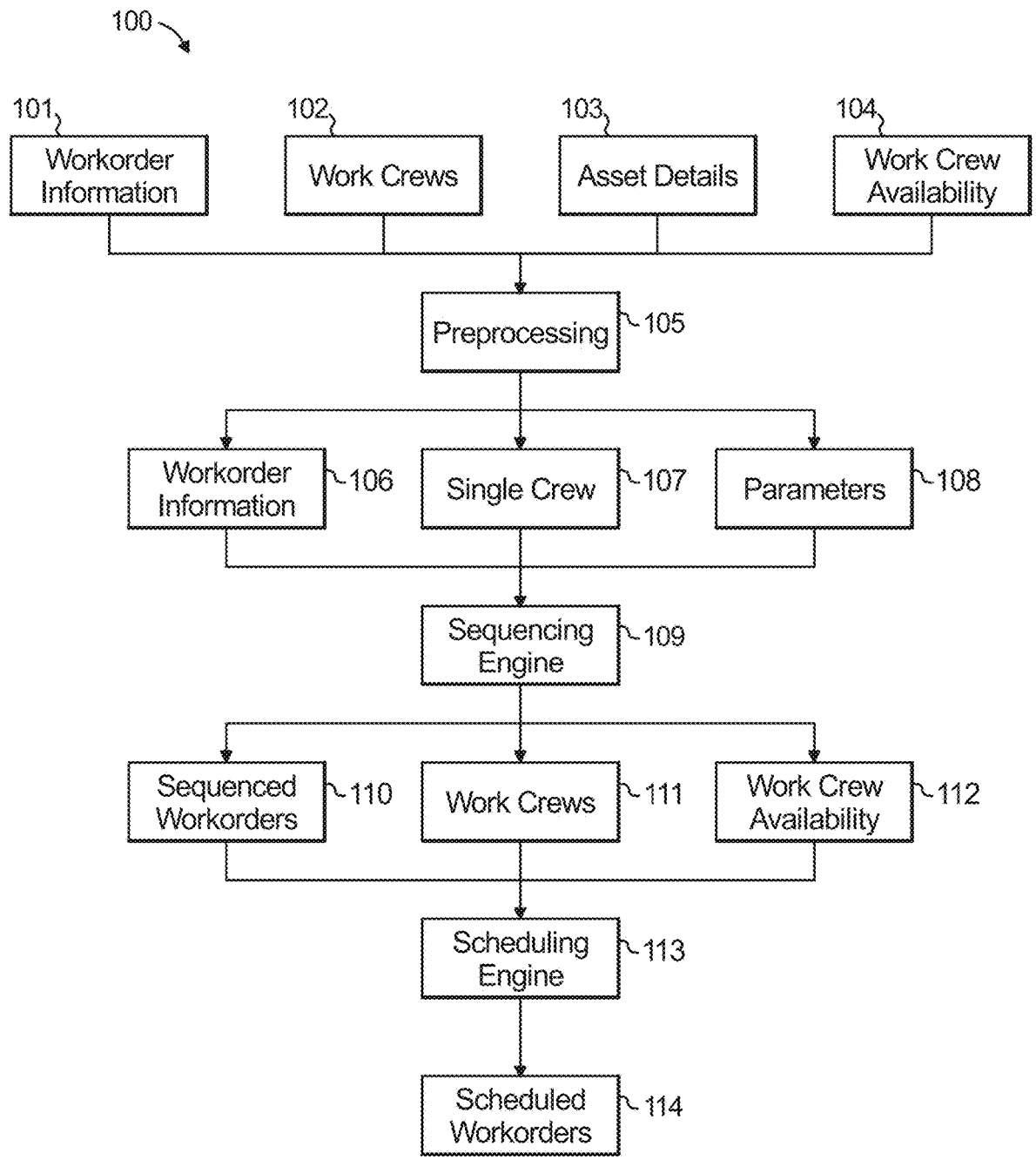
FIG. 1 is an exemplary flow diagram for workorder scheduling and sequencing according to an embodiment of the present disclosure.

According to an exemplary embodiment of the present disclosure, a method 100 for creating a spatio-temporal schedule is illustrated in FIG. 1 and includes maximizing a user selected objective, such as a maximum sum of priorities of workorders or a maximum number of workorders, and generating an optimal route for work crews given a maximized objective.

Referring more particularly to FIG. 1, workorder information 101 (e.g., including workorder asset type, priority, skill requirements for a given task, precedence constraints, problem codes, time window, etc.), work crew listings 102, asset details 103 (e.g., the type of asset, problem codes, predicted maintenance times, asset manufacturer, etc.), and work crew availability 104 can be combined in a preprocessing 105 to determine workorder information 106, single crew 107, and parameters 108. The workorder information 106, single crew 107, and parameters 108 can be input to a sequencing engine 109 (see for example FIG. 5), which tangibly embodies the objective. The objectives can be subject to a variety of constraints. The sequencing engine 109 can use the received data to generate a selection of workorders. The selection of workorders are the sequenced workorders 110, for example, the workorders to be performed in a given time period (e.g., in one work shift). The sequencing engine 109 can also output a work crew listing 111 and crew availability 112.

Certain data received by the sequencing engine 109 can be considered to be constraints on the sequenced workorders 110. Exemplary constraints can specify that there be no overlap in time between workorders for each work crew. The exemplary constraints can include travel times for a work crew, a starting location of a work crew (e.g., a location of a depot), an end location of the work crew, boundary workorders to be handled, and spatial relationships between tasks (e.g., to cluster tasks assigned to the work crew). Additional constrains can include the type of travel required between tasks (e.g., highways, secondary roads, one-way streets, tolls), current conditions (e.g., road closures, congestion, etc.), task level dependency, and task time windows. Further still, constraints can be structured as variables to be maximized, such as the potential re-use of shared resources, the potential sharing of skilled crews, etc.

More particularly, the sequencing engine 109 can operate maximize a user selected objective given one crew and all workorder. The maximization of the objective can be determined as a maximum sum of priorities of workorders or maximize the number of workorders (e.g., schedule all workorders) subject to certain constraints.

The constraints can specify, for example, that no overlap in time exist between workorders for same crew (C1), that travel times are accounted for (C2), that crews starts from the depot (C3), that crews end at the depot (C4), that there are no stragglers or unscheduled workorders (C5), start from a farthest workorder (C6).

Referring again to FIG. 1, an optimal route for work crews can be generated by minimizing a stun of maximum end time of workorders. For example, subject to one or more constraints (for example, as exemplified herein) tasks scheduled according to the maximizing of the user selected objective can be scheduled. For example, given the scheduled workorders 110, a scheduling engine 113 (see for example, FIG. 6) sequences the sequenced workorders 110 to generated scheduled workorders 114. The scheduling engine 113 further considers work crew location 111, work crew availability 112, etc.

Here, the scheduling engine 113 operates to generate an optimal route for each crew, and includes minimizing a sum of maximum end time of workorders, subject to (C1) to (C4), all tasks need to be scheduled (C7), work crew capacity constraints (C8), work crew availability (C9), etc.

Figure 2A:
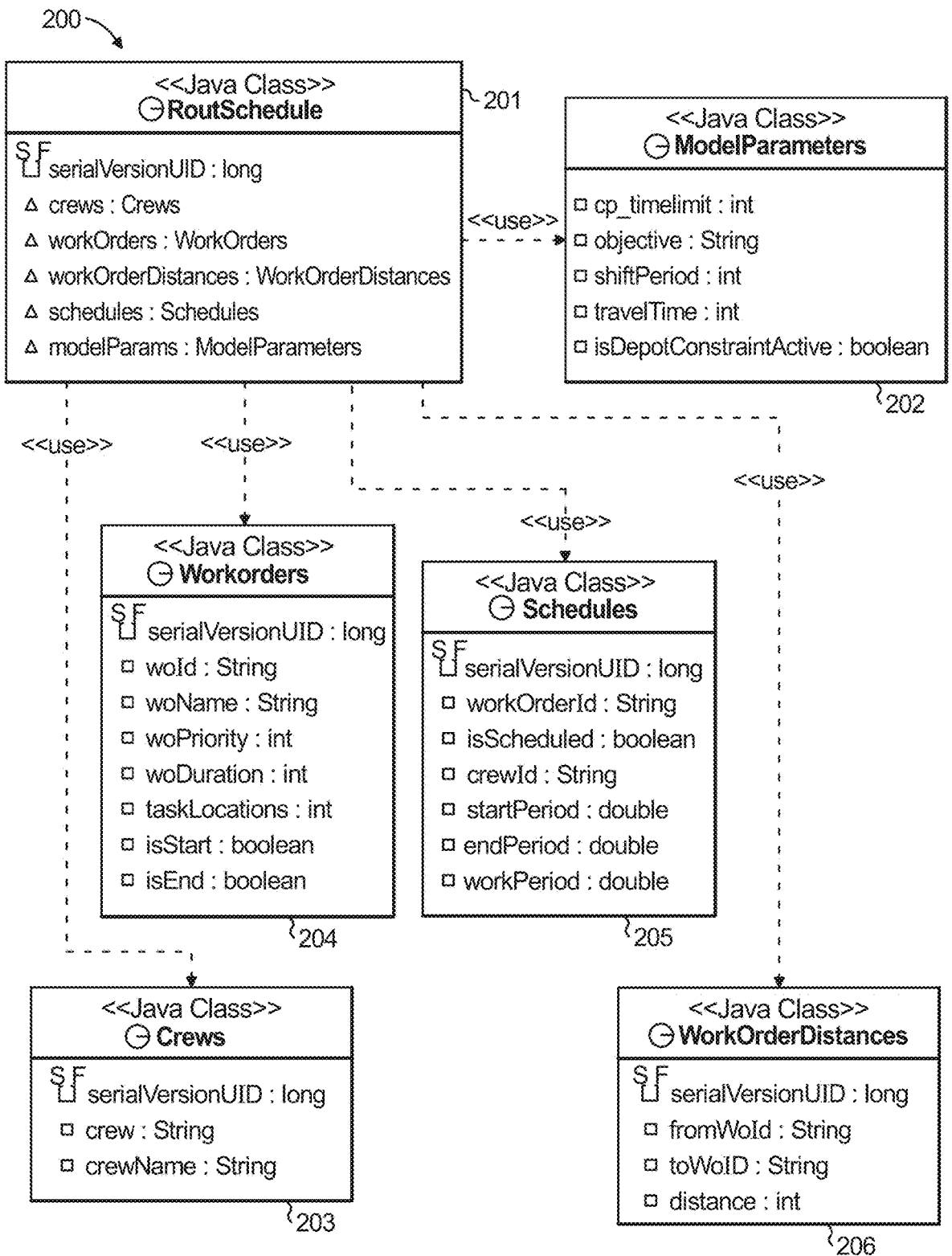
FIG. 2A is an exemplary data model according to an embodiment of the present disclosure.

FIG. 2A shows an exemplary data model 200 according to an exemplary embodiment of the present disclosure. The data model is shown as a collection of Java classes, and includes modules for route scheduling 201, model parameters 202, crews 203, workorders 204, work crew schedules 205, and workorder distributions 206.

Figure 2B:
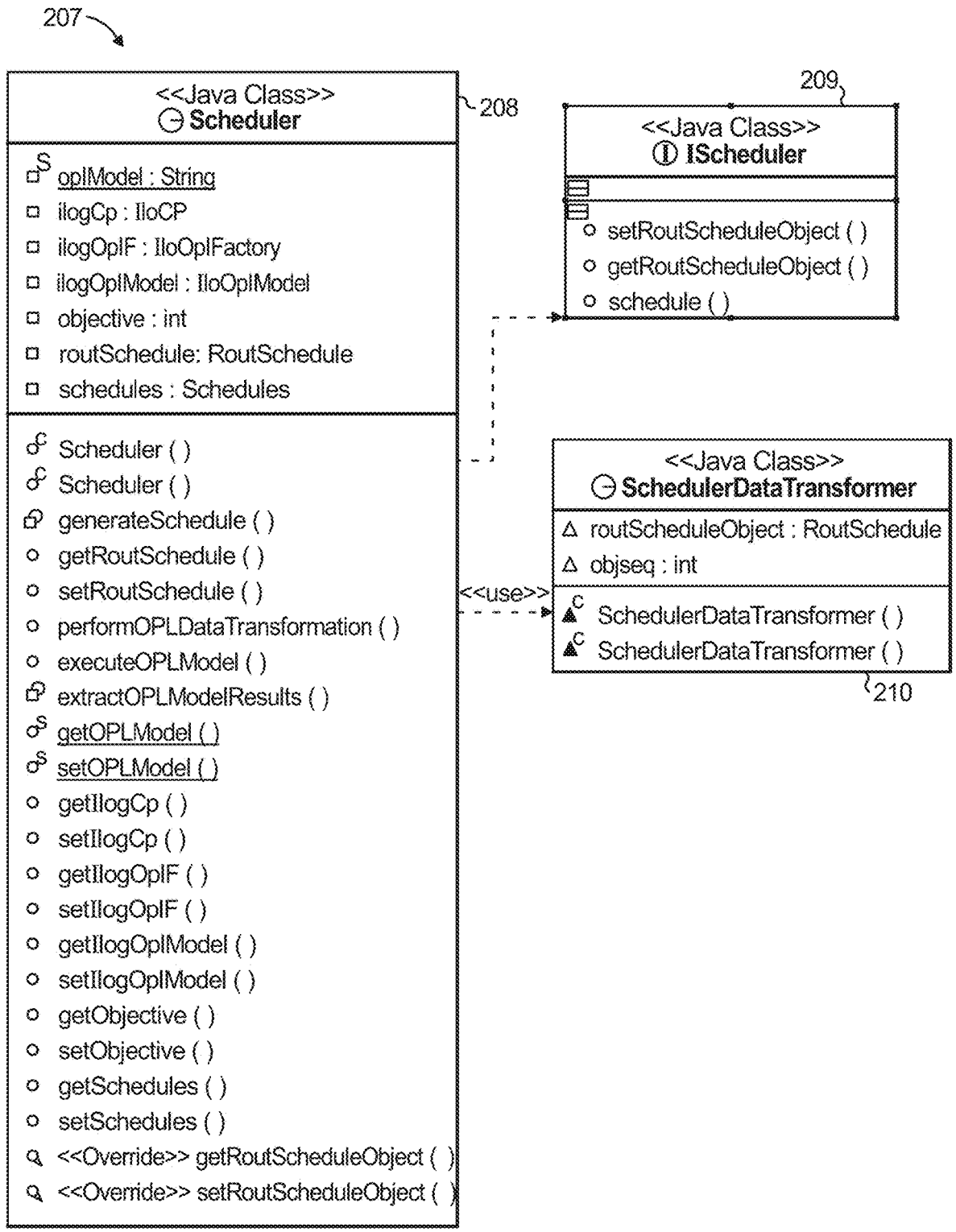
FIG. 2B is an exemplary scheduler interface according to an embodiment of the present disclosure.

FIG. 2B shows exemplary Java classes for a scheduler interface 207 including modules for a scheduler 208, a scheduler interface class 209, and a data transformer 210.

In FIGS. 2A-B, configuration parameters include the following:
1) private int cp_timelimit; //max time for solution search: exemplary default 15 seconds
2) private String objective; //objective function to be used: exemplary default: OBJ_MAX_NUM
3) private int shiftPeriod; //total period that the crew can work in a shift: exemplary default 480*60
4) private int travelTime; //additional travel time to account for congestion & mobilization/de-mobilization
5) private Boolean is DepotConstraintActive; //include depot constraints Further, in FIGS. 2A-B, the model objectives include the following:
1) OBJ_MAX_NUM//Maximize the number of priorities
2) OBJ_MAX_SUM_PRIO//Maximize the sum of priorities of workorders
3) OBJ_MAX_SUM_DUR//Maximize the sum of duration of workorders
4) OBJ_MAX_SUM_PRIO_DUR//Maximize the sum-product of priorities and duration of workorders
5) OBJ_MIN_DISTANCE//Minimize the distance travelled In view of the foregoing, an exemplary notation is provided in Table 1, which can be used Constraint Programming (CP) formulation and scheduling as illustrated FIG. 1.

TABLE 1

| Notation | |
|---|---|
| Sets | |
| $C = \{c_1, c_2, \ldots, c_M\}$ | Available crews |
| $W = \{w_1, w_2, \ldots, w_N\}$ | Workorders to be scheduled |
| $L = \{l_1, l_2, \ldots, l_N\}$ | Locations of workorders |
| $c^*$ | Super crew to assign all workorders |
| $l_0$ | Depot location |
| $w_0$ | A dummy Workorder created at $l_0$ with zero duration |
| Parameters | |
| $d_n$ n ∈ 1 ... N | Duration of workorders |
| $\bar{d}$ | Total time that super crew $c^*$ can work |
| $p_n$ n ∈ 1 ... N | Priority of workorders |
| $l_n$ n ∈ 1 ... N | Location of the workorders |
| $t_{n1,n2}$ | Travel time between locations $l_{n1}$ and $l_{n2}$ |
| $o_k$ k ∈ 1 ... K | Bcoleu flag to include/exclude objective functions |
| isDepot | Boolean Lag to include/exclude depot location for crews |
| Decision Variables | |
| $I_n$ n ∈ 1 ... N | CF interval variables for workorders |
| $J_{m,n}$ m ∈ 1 ... M, n ∈ 1 ... N | CP interval variables for crews |
| $S_m$, m ∈ 1 ... M | CP sequence variables for crews |

More particularly, as shown in Table 1, the Sets can include:

C is the set of crews with cardinality M. A super-crew $c^*$ can be defined that is capable of performing all workorders. That is, the super-crew can include one or more actual crews.

W is the set of workorders with cardinality N. We define a dummy workorder $\omega_0$ with zero duration $d_0=0$, at the depot location. This is required if crews are required to start the day from a central depot.

L is the set of workorder locations with cardinality N, where depot locations is set to $l_0$.

As shown in Table 1, Parameters can include:

Parameters $d_n$ capture the required duration for the workorder $\omega_n$ to be performed.

Parameter $\bar{d}$ captures maximum work time (including the travel times) that can be assigned to super-crew $c^*$. This parameter is calculated by considering all crews availability, such as, if there are three crews, and each can work 8 hours, then maximum work time $\bar{d}=24$ hours.

Parameters $p_n$ captures the priorities of the workorders; the bigger the $p_n$ value is, the higher the priority.

Parameters $l_n$ captures the workorder location information.

Parameters $t_{n1,n2}$ captures the travel time between locations $l_{n1}$ and $l_{n2}$.

Parameters $o_k$ are flags for turning on/off any objective function, such as maximizing the number of scheduled workorders, or minimizing the completion time of the crews.

Parameter is Depot is a flag for turning on/off the requirement for the crews starting the day from the central-depot.

Further, the Decision Variables can include:

$I_n$, $n \in 1 \ldots N$ are special Constraint Programming interval variables defined for each workorder. For any workorder $\omega_n$, these decision variables capture if the workorder is scheduled or not (presenceOf($\omega_n$)), the start time of the workorder startTime($\omega_n$), and the end time of the workorder endTime($\omega_n$).

$J_{m,n}$, $m \in 1 \ldots M$, $n \in 1 \ldots N$ are special Constraint Programming interval variables defined for each crew and workorder. For any crew $c_m$ and workorder $\omega_n$, these decision variables capture if the workorder $\omega_n$ is assigned to the crew $c_n$ presenceOf(m,n), the start time of the crew performing the workorder startTime(m,n), and end time of the crew completing the workorder endTime(m,n).

$S_m$ $m \in 1 \ldots M$ are special Constraint Programming sequence variables defined for each crew $c_m$, containing ordered list of workorders assigned to crew $c_m$.

Referring now to FIG. 3; an exemplary work management data flow 300 is shown, according to an embodiment of the present disclosure. The exemplary work management data flow 300 assumes scheduling at the beginning of some work period, for example, the beginning of a workday. The work management data flow 300 can begin with the selection of asset types, crews, workorders and objectives at 304 using a user interface 301. Given the selections, business logic 302 (e.g., embodied in software and/or hardware) performs the preprocessing (see also block 105 in FIG. 1) at 305, and passes the preprocessed data to a model 306 for determining a schedule and sequence at 307. A post-processing logic can be applied at 308, for example, for adjustment according to a business constraint. At 309, the schedule and sequence determined at 307 can be output, for example, as route maps, work sequence lists, printed schedules, uploaded calendar events (e.g., in a cloud computer environment), etc.

Figure 4:
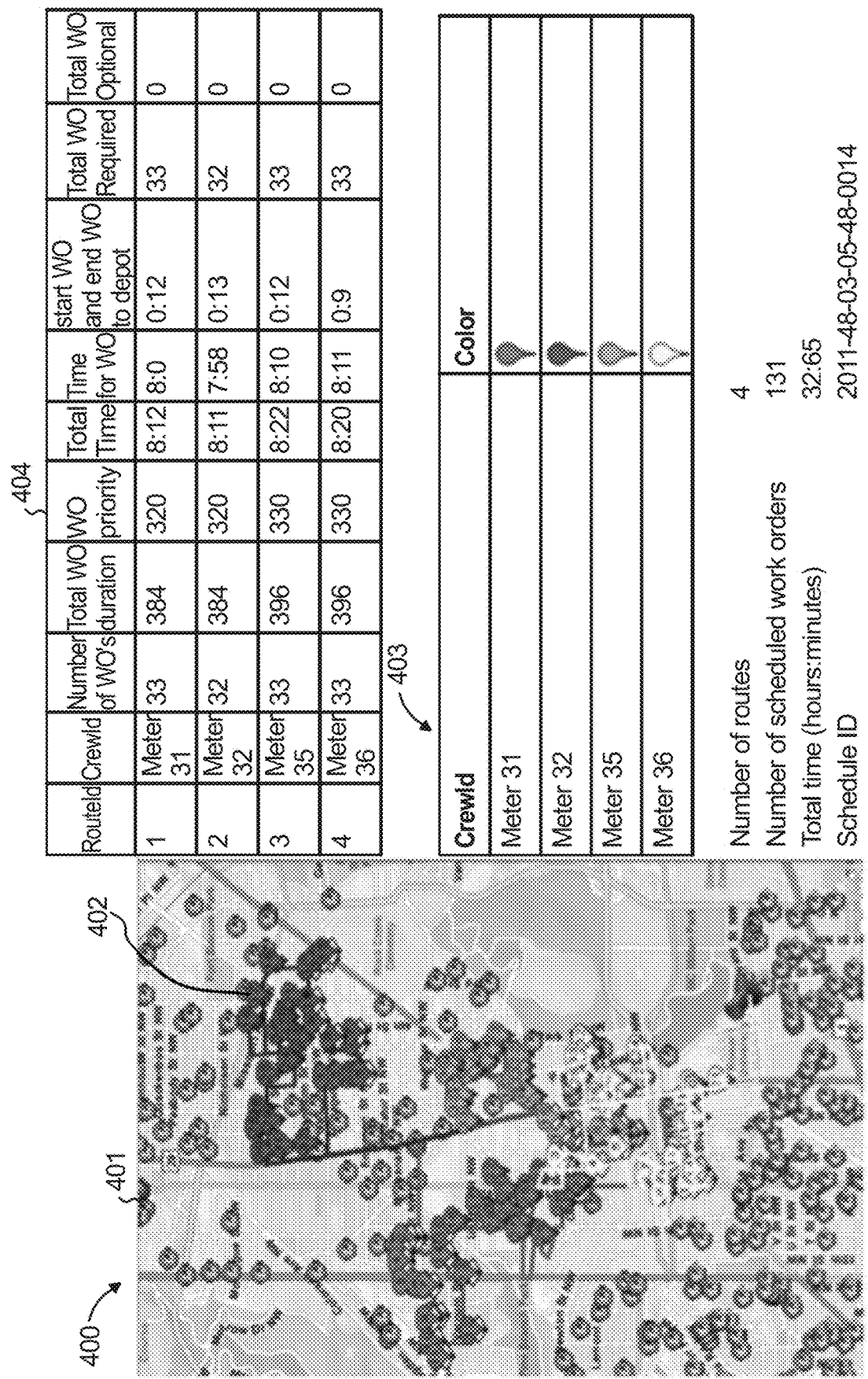
FIG. 4 is an exemplary spatio-temporal scheduling interface according to an embodiment of the present disclosure.

Referring now to FIG. 4; an exemplary spatio-temporal scheduling interface 400 is shown, according to an embodiment of the present disclosure. The exemplary spatio-temporal scheduling interface 400 includes a map 401 showing the location of tasks using markers, e.g., 402. The color of the markers can indicated various information; in FIG. 4 color is associated with tasks assigned to different work crew/equipment ("CrewId"), e.g., 403. The markers can be numbered to indicate a scheduled order. A table 404 can be used to display constraints, variables and other information.

Referring to FIG. 5, scheduling can be considered an NP-hard problem (non-deterministic polynomial-time hard). In many cases, it can be difficult or even impossible to solve large size problems with direct optimization methods (by solving mixed integer programming formulation). FIG. 6 is an exemplary iterative algorithm with applications to scheduling. The exemplary iterative algorithm includes (1) a constraint programming formulation (Model 1 shown in FIG. 5) to solve a workorder sequencing problem for a single super-crew (which is assumed to be capable of performing all workorders) and (2) a method of assigning sequenced workorders to the available crews.

Model 1 of FIG. 5 captures a Constraint Programming (CP) formulation for the workorder sequencing problem. Note that, since all the workorders can be assigned to one crew c* (super-crew), all the crew-indexes m can be replaced with c* in Model 1.

Referring to Model 1 shown in FIG. 5, the input includes a model of workorders to be sequenced $S=\{w_1, w_2, \ldots, w_N\}$, which are to be assigned to a super-crew. Model 1 outputs sequenced workorders $\hat{S}=\{\hat{w}_1, \hat{w}_2, \ldots, \hat{w}_N\}$, with start times startTime($\hat{w}_N$) and end times endTime($\hat{w}_N$) for each workorder. Note that, sequenced workorders are shown with a "hat."

At Line 1, a model is flagged or selected to use as a solver the IBM ILOG CP engine is used.

At Lines 2-4, a time limit is set for a model run-time.

At Line 5, CP interval variables for workorders can be defined. In the example, these variables are specified as "optional," which gives the model the flexibility of assigning or not-assigning these workorders to a crew. If these variables are not optional, then the model will force all workorders to be assigned. The domain of these variables can be defined as "in 0 ... $\bar{d}$," which guarantees any workorder to be sequenced in between time zero and the maximum work time. Duration of these variables can be defined as "size $d_n$."

At Line 6, the CP interval variables for each crew and workorder can be defined. These variables have similar settings as the variables $I_n$, in terms of being "optional," and having the same domain and duration.

At Line 7, the CP sequence variable for the super-crew can be defined. This variable contains the ordered list (sequence) of the assigned workorders (which are captured in variables $J_{c*,n}$). Therefore the sequence variable domain is defined as "in all $(n \in 1 \ldots N) J_{c*,n}$". Locations of the workorders are associated with the sequence variable by "types L" in order to capture the travel times between the workorders.

At Line 8, a first objective can be defined, capturing a prioritized assignment (coverage) of workorders.

At Line 9, a second objective can be defined, capturing the completion time of the super-crew.

At Line 10, a third objective can be defined, capturing the number of assigned workorders.

At Line 11, a model objective function can be defined, including the first through third objectives defined at lines 8 through 10. Each objective can be associated with a flag for turning individual objectives on or off for example, by user's selection. It should be understood that a method according to an embodiment of the present disclosure can include one or more objectives and it not limited to the examples described herein.

At Lines 12-19, the model constraints can be defined. A first set of constraints (at line 13) guaranty that, if any workorder is present, then it has to be assigned to the super-crew. A second constraint (at line 14) prevents any overlap in the sequence of the assigned workorders, making sure that, the crew does not start a workorder before completing the previous one. The parameter "t" imposes the travel time between the workorders. A third set of constraints (at lines 15-18), force the crew to start from the home-depot at the beginning of the day.

Referring to FIG. 6, an exemplary iterative scheduling method running a Constraint Programming (CP) model (e.g., Model 1 shown in FIG. 5) assigns sequenced workorders to the available crews. The exemplary iterative scheduling method takes a list of available crews $C=\{c_1, c_2, \ldots, c_M\}$, and list of workorders $S=\{w_1, w_2, \ldots, w_N\}$ to be scheduled (sequenced and assigned to a crew) as inputs. The exemplary iterative scheduling method outputs assignments $A_m$ of the sequenced workorders to each crew $c_m$.

At Line 1, an initial run of the CP model is run with all workorders in $S=\{w_1, w_2, \ldots, w_N\}$. The model returns sequenced workorders $\hat{S}=\{\hat{w}_1, \hat{w}_2, \ldots, \hat{w}_N\}$, along with start times startTime($\hat{w}_N$) and end times endTime($\hat{w}_N$) for each workorder.

At Lines 2-3, indexes for the crews and the workorders to iterate are initialized.

At Lines 4-22 the method loops to iterate through all workorders and crews until any of these sets is empty.

More particularly, at Lines 5-6, the start and end times of a selected crew are initialized to the start and end times of a selected workorder.

At Lines 7-12, the method loops to iterate through all workorders in the sequenced list (e.g., determined according to FIG. 5), to assign to the selected crew until the selected crew's available time is reached. The $n^{th}$ workorder in the list of sequenced workorders $\hat{S}$ is assigned to crew $c_m$ at line 8. The assigned workorder is removed from the set $\hat{S}$ (at line 9). The method iterates to the next workorder in the list (at line 10), and an end time of the crew is updated to the end time of a next workorder (at line 11).

At Lines 13-21, after the crew $c_m$ is fully allocated, its utilization is compared with an average utilization of the previous crews ($c_1, c_2, \ldots, c_{m-1}$). The utilization of a crew $c_m$ can be determined as $U_m = \Sigma_{n \in A_m} d_n/(d_n + t_{n,n+1})$, which is the ratio of total work time "over total time spent." If the utilization of the crew $c_m$ is below an alpha-weighted average of the previous crews (where alpha<1), then all the assigned workorders are withdrawn from the crew $c_m$ (at line 14), and the Model 1 is resolved (in line 17) for the remaining workorders.

If the crew $c_m$ satisfies the utilization criteria, then it is removed from the list of the available crews (at line 19), and iterated to a next available crew in the list (at line 20).

According to an exemplary embodiment of the present disclosure, in one implementation, a method of performing field services optimization can be applied to the utility industry, including water, power, oil and gas by introducing spatio-temporal constraints.

According to an exemplary embodiment of the present disclosure, in one implementation, a method of performing field services optimization can improve the up-time of assets in a field by efficient scheduling of field services.

Embodiments of the present disclosure may be associated with various advantages including robust operational deployment with detailed sequence of tasks taking into account geographic co-ordinates, work time, travel time and additional constraints, the efficient utilization of constrained resources, minimizing windshield time, manual scheduling, drive-by misses (legal issues), and long term analysis of maintenance programs.

It is understood that embodiments of the present disclosure include cloud computing environments. Indeed, embodiments of the present disclosure are capable of being implemented in conjunction with any other type of computing environment now known or later developed.

Cloud computing is a model of service delivery for enabling convenient, on-demand network access to a shared pool of configurable computing resources (e.g., workers) that can be rapidly provisioned and released with minimal management effort or interaction with a provider of the service. This cloud model may include at least five characteristics, at least three service models, and at least four deployment models.

Characteristics of an exemplary cloud model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected computer devices or nodes (e.g., master nodes and worker nodes).

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor," "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 7:
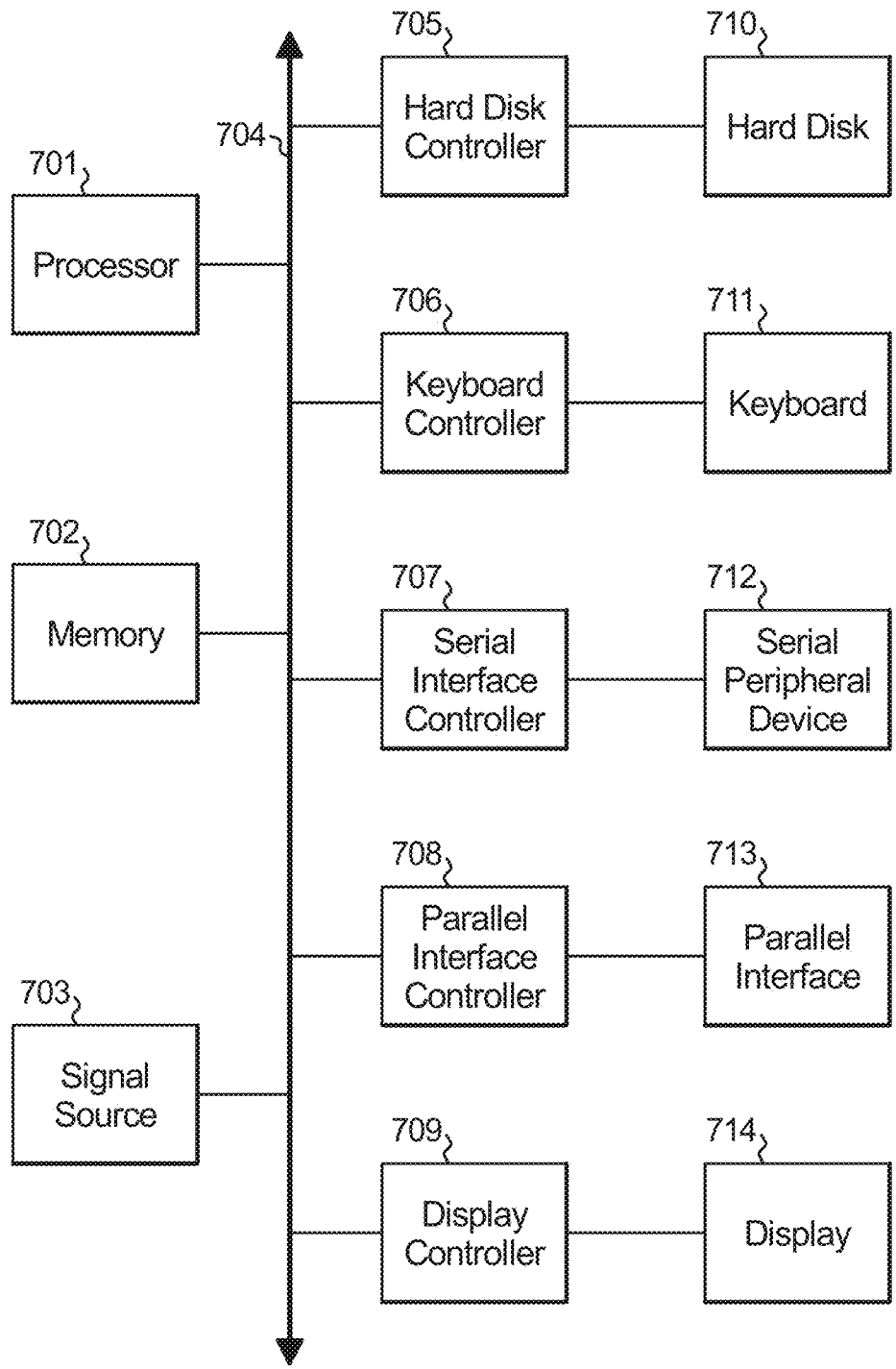
FIG. 7 is a block diagram depicting an exemplary computer system for creating a spatio-temporal schedule according to an embodiment of the present disclosure.

For example, FIG. 7 is a block diagram depicting an exemplary computer system for creating a spatio-temporal schedule according to an embodiment of the present disclosure. The computer system shown in FIG. 7 includes a processor 701, memory 702, signal source 703, system bus 704, Hard Drive (HD) controller 705, keyboard controller 706, serial interface controller 707, parallel interface controller 708, display controller 709, hard disk 710, keyboard 711, serial peripheral device 712, parallel peripheral device 713, and display 714.

In these components, the processor 701, memory 702, signal source 703, HD controller 705, keyboard controller 706, serial interface controller 707, parallel interface controller 708, display controller 709 are connected to the system bus 704. The hard disk 710 is connected to the HD controller 705. The keyboard 711 is connected to the keyboard controller 706. The serial peripheral device 712 is connected to the serial interface controller 707. The parallel peripheral device 713 is connected to the parallel interface controller 708. The display 714 is connected to the display controller 709.

In different applications, some of the components shown in FIG. 7 can be omitted. The whole system shown in FIG. 7 is controlled by computer readable instructions, which are generally stored in the hard disk 710, EPROM or other non-volatile storage such as software. The software can be downloaded from a network (not shown in the figures), stored in the hard disk 710. Alternatively, software downloaded from a network can be loaded into the memory 702 and executed by the processor 701 so as to complete the function determined by the software.

The processor 701 may be configured to perform one or more methodologies described in the present disclosure, illustrative embodiments of which are shown in the above figures and described herein. Embodiments of the present disclosure can be implemented as a routine that is stored in memory 702 and executed by the processor 701 to process the signal (e.g., user selections) from the signal source 703. As such, the computer system is a general-purpose computer system that becomes a specific purpose computer system when executing the routine of the present disclosure.

Although the computer system described in FIG. 7 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A non-transitory computer readable medium comprising executable instructions, the executable instructions being executable by one or more processors to perform a method of scheduling a plurality of field services on assets and generating a geographic route for each of a set of available work crews, the method comprising:
   receiving a set of workorders, each workorder of the set of workorders including a start time, an end time, task location, and one of the plurality of field services on an asset;
   receiving, from a user, a selection of a plurality of objectives via an interface;
   preprocessing, by the one or more processors executing hardware logic of the one or more processors, the set of workorders and the plurality of objectives, thereby generating preprocessed data;
   providing, by the one or more processors, the preprocessed data to a data model, the data model comprising a set of computer programming language classes;
   determining, by the one or more processors, based on the preprocessed data and the data model, a sequence of the set of workorders, the determining being subject to: maximizing the plurality of selected objectives and the data model, the plurality of selected objectives including sequencing each of the set of workorders based on a priority of the workorder, completion time of a supercrew of all of the set of workorders, travel time between workorders, and a number of assigned workorders, constraints of the data model including a guarantee that all workorders of the set of workorders are sequenced, there is no overlap in the sequence of workorders, the travel times for at least one work crew, and a requirement that all work crews of the supercrew start at a specified location, the supercrew comprising the set of available work crews;
   identifying, by the one or more processors, equipment for at least one or more of the workorders located at the least one task location; and
   iterating, by the one or more processors, through the set of available work crews, for each of the work crews of the set of available work crews:
      assigning, by the one or more processors, successive ones of the sequence of the set of workorders to a current work crew of the set of available work crews until the current work crew is fully allocated before selecting a next work crew;
      identifying, by the one or more processors, based on an output of the data model using the preprocessed data as input for the data model, geographic routes for each current work crew based on assignments;
      determining, by the one or more processors, a first utilization of the current work crew, the determination of the first utilization being a ratio of a total work time for the current work crew divided by a total time spent for the current work crew, the total time spent for the current work crew including travel time between successive workorders of the sequence of the set of workorders for the current work crew; and
      outputting to the interface, by the one or more processors, at least one of the geographic routes for each of the work crews and an icon for each task location associated with the workorder along the at least one of the geographic routes, the interface further depicting the identified equipment for the at least one or more of the workorders located at the at least one task location and depicting at least one schedule, the at least one schedule including the sequence of the set of workorders for each of the work crews of the set of available work crews along the at least one of the geographic routes, thereby improving up-times of the assets in a field by efficient scheduling of field services.

2. The non-transitory computer readable medium of claim 1, the method further comprising receiving a maximum time limit to determine the sequence of the set of workorders.

3. The non-transitory computer readable medium of claim 1, the method further comprising if the first utilization of the current work crew is less than an alpha-weighted average of other work crews of the set of available work crews:
   removing all workorders assigned to the current work crew from the current work crew;
   determining a new sequence of unassigned workorders of the set of workorders, the determining being subject to maximizing the plurality of selected objectives and the constraints of the data model;

assigning successive ones of the new sequence of unassigned workorders to the current work crew of the set of available work crews until the current work crew is fully allocated;

determining a second utilization of the current work crew;

comparing the second utilization to the alpha-weighted average of other work crews of the set of available work crews; and if the second utilization is greater than the alpha-weighted average of other work crews, then the current work crew is removed from a list of available work crews.

4. The non-transitory computer readable medium of claim 1, the method further comprising if the first utilization of the current work crew is greater than an alpha-weighted average of other work crews, then the current work crew is removed from a list of available work crews.

5. The non-transitory computer readable medium of claim 1, wherein maximizing the plurality of selected objectives is maximizing a sum of the priority of each of the workorders in the set of workorders.

6. The non-transitory computer readable medium of claim 1, wherein maximizing the plurality of selected objectives is maximizing a sum of a duration of each of the workorders in the set of workorders.

7. The non-transitory computer readable medium of claim 1, wherein maximizing the plurality of selected objectives is minimizing a sum of a distance travelled by each of the work crews of the set of available work crews.

8. The non-transitory computer readable medium of claim 1, the method further comprising, for each of the work crews of the set of available work crews, sending the work crew along the at least one of the geographic routes.

* * * * *